United States Patent Office 2,759,938
Patented Aug. 21, 1956

2,759,938

DIALKYL PYRIDAZINYL PHOSPHATE ESTERS

Shirley Du Breuil, Stamford, Conn., assignor to American Cyanamid Company, New York, N. Y., a corporation of Maine No Drawing. Application March 21, 1955,
Serial No. 495,775

8 Claims. (Cl. 260—250)

The present invention relates to new and useful phosphate esters and the method of preparation thereof.

These new esters are the O,O-dialkyl O-(3-pyridazinyl) phosphates which conform to the general formula

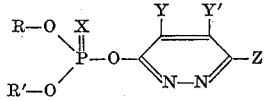

in which R and R' are chosen from the group of lower alkyl radicals such as methyl, ethyl, propyl and butyl, X represents a member of the group consisting of sulfur and oxygen, Z represents a member of the group consisting of Br, Cl and OH, Y and Y' represent a member of the group consisting of hydrogen, a halogen, a phenyl radical and a lower alkyl radical, and when taken together Y and Y' represent the remainder of a benzene ring.

The above compounds may be readily prepared by reacting a dialkyl phosphoric chloride of the formula

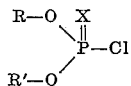

in which X, R and R' have the meaning shown above, with an alkali metal salt of an hydroxypyridazine of the formula

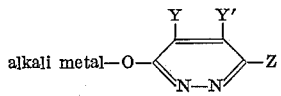

in which Y, Y' and Z have the meaning shown above, in an inert solvent.

The compounds of the present invention may also be prepared by reacting the dialkyl phosphoric chloride with the hydroxypyridazine in an inert solvent in the presence of a hydrogen chloride acceptor such as the alkali metal and alkaline earth metal carbonates. For example, in the preparation of O,O-dipropyl O-(6-hydroxy-3-pyridazinyl) thiophosphate, the reaction may be illustrated as follows:

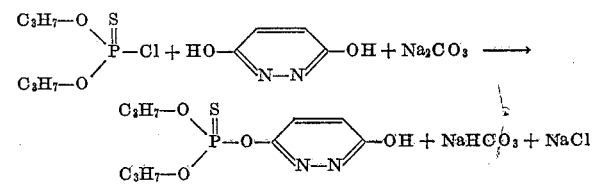

The reaction may be carried out at temperatures within the range of from about 10° to 100° C., and preferably between 20° and 60° C.

Suitable inert solvents for the reaction include water, dimethyl formamide, dimethyl sulfoxide, dioxane, acetonitrile, benzene, toluene, xylene, the lower aliphatic monohydric alcohols, ketones such as acetone, methyl ethyl ketone, methyl isobutyl ketone, methyl benzyl ketone and cyclohexanone, and aliphatic esters such as ethyl acetate, 2-ethylhexyl acetate, methyl propionate, ethyl butyrate and isopropyl butyrate.

The hydroxypyridazines utilized in the present process are readily prepared by the reaction of maleic anhydride, substituted maleic anhydrides and phthalic anhydrides, with hydrazine or a hydrazine salt such as hydrazine dihydrochloride, according to the method disclosed in the Journal of the American Chemical Society 73, 1873–4 (1951). The reaction of maleic anhydride with hydrazine dihydrachloride to produce 3,6-dihydroxypyridazine may be illustrated as follows:

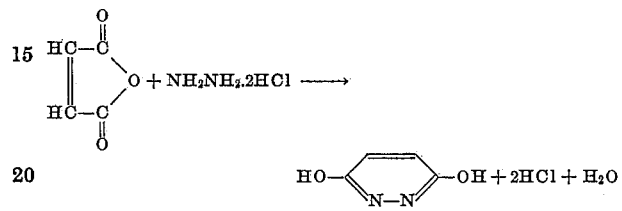

The alkali metal salts of the hydroxypyridazines may be prepared by reaction of the hydroxypyridazine with an alkali metal hydroxide in water, followed by precipitation with ethanol.

The following examples will further illustrate the invention.

EXAMPLE 1

O,O-dimethyl O-(6-hydroxy-3-pyridazinyl) thiophosphate

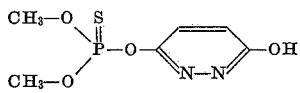

Potassium hydroxide (0.15 mol) was dissolved in 100 cc. of water and 3,6-dihydroxypyridazine (0.15 mol) was added to yield a clear solution. O,O-dimethyl thiophosphoric chloride (0.15 mol) was added, and the reaction mixture was stirred at room temperature (25° C.) for 5 hours. 100 cc. of toluene was added and the mixture was filtered. The toluene layer was separated from the aqueous layer, washed with 10% aqueous sodium bicarbonate, and evaporated to give a 51.7% yield of the desired compound. After recrystallization from a mixture of ether and heptane, the product melted at 69–70° C. Neutral equivalent 235. 96 (theory 236.19).

*Analysis.*—Theory P, 13.11: N, 11.86. Found P, 13.05; N, 11.76.

EXAMPLE 2

O,O-diethyl O-(6-hydroxy-3-pyridazinyl) thiophosphate

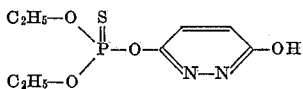

The procedure of Example 1 was employed using 0.1 mol of potassium hydroxide, 0.1 mol of 3,6-dihydroxypyridazine and 0.1 mol of O,O-diethylthiophosphoric chloride. The reaction mixture was heated at 65° C. for 4 hours. The product, after recrystallization from an ethyl ether-petroleum ether mixture, melted at 90–91.5° C. Neutral equivalent 255.18 (theory 264.24).

*Analysis.*—Theory P, 11.46; N, 10.60. Found, P, 11.69; N, 10.54.

EXAMPLE 3

O,O-diethyl O-(4-hydroxy-1-phthalazinyl) thiophosphate

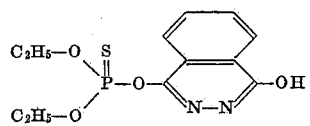

The procedure of Example 1 was employed using 0.2 mol of sodium hydroxide, 0.2 mol of 1,4-dihydroxyphthalazine and 0.2 mol of O,O-diethyl thiophosphoric chloride. The reaction mixture was heated to 60–65° C. for 2 hours. After recrystallization from toluene, the product melted at 99–100° C. The product was not acidic enough to titrate with aqueous sodium hydroxide.

*Analysis.*—Theory P, 9.86; N, 8.91. Found P, 9.68; N, 8.84.

EXAMPLE 4

*O,O-di-n-propyl O-(6-hydroxy-3-pyridazinyl) thiophosphate*

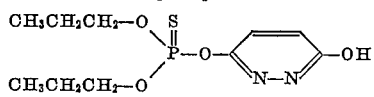

A mixture of 3,6-dihydroxypyridazine (0.12 mol) and anhydrous sodium carbonate, 0.12 mol) was suspended in 150 cc. of anhydrous dimethyl formamide. O,O-di-n-propyl thiophosphoric chloride (0.12 mol) was added, and the reaction mixture was stirred at room temperature for 23 hours, then filtered, and the solvent removed under vacuum. The resulting semi-crystalline residue was treated with 100 cc. of toluene and the mixture was again filtered. The toluene solution was washed with 10% aqueous sodium bicarbonate, filtered through a mat of anhydrous magnesium sulfate, and evaporated to give 57.3% yield of the desired product. After recrystallization from a mixture of benzene and heptane, the compound melted at 113–114° C. Neutral equivalent 292.38 (theory 292.29).

*Analysis.*—Theory N, 9.59; S, 10.97. Found N, 9.59; S, 10.99.

EXAMPLE 5

*O,O-diisopropyl O-(6-hydroxy-3-pyridazinyl) thiophosphate*

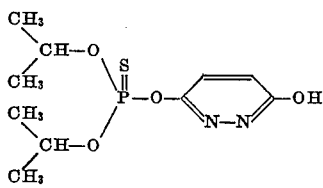

The procedure of Example 4 was employed using 0.15 mol of 3,6-dihydroxypyridazine, 0.15 mol of anhydrous sodium carbonate and 0.15 mol of O,O-diisopropyl thiophophoric chloride. The product, after recrystallization form a benzene-heptane mixture, melted at 86.5–87° C. Neutral equivalent 280.98 (theory 292.29).

*Analysis.*—Theory N, 9.59; S, 10.97. Found N, 9.54; S, 11.17.

EXAMPLE 6

*O,O-di-n-butyl O-(6-hydroxy-3-pyridazinyl) phosphate*

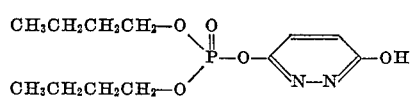

The sodium salt of 3,6-dihydroxypyridazine (0.12 mol) and O,O-di-n-butyl phosphoric chloride (0.12 mol) were added with stirring to 200 cc. of anhydrous dimethyl formamide. The temperature of the mixture rose to 39° C., and stirring was continued for 3.5 hours. The procedure of Example 4 was employed for the recovery of the crude liquid product from the reaction mixture. The crude product was purified by dissolving it in a calculated quantity of 0.5 N sodium hydroxide and extracting the neutral impurities with ether. The alkaline solution was reacidified with concentrated hydrochloric acid to a pH of 6, and then extracted with ether. Evaporation of the ether solution gave the desired product, an orange-colored, viscous oil having a refractive index $n_D^{25}$ 1.4832. Neutral equivalent 314.70 (theory 304.28).

*Analysis.*—Theory P, 10.18; N, 9.21. Found P, 10.65; N, 9.32.

EXAMPLE 7

*O,O-diethyl O-(4-5,dibromo-6-hydroxy-3-pyridazinyl) thiophosphate*

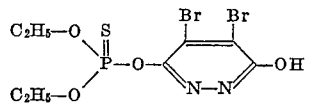

The procedure of Example 4 was employed using 0.08 mol of 4,5-dibromo-3,6-dihydroxypridazine, 0.08 mol of anhydrous sodium carbonate, 0.08 mol of O,O-diethyl thiophosphoric chloride and 170 cc. of anhydrous dimethyl formamide. A 20.2% yield of crude product was obtained. The crude material was dissolved in an equivalent of aqueous sodium hydroxide, the neutral impurities extracted out with ether, and the product precipitated with hydrochloric acid. After recrystallization from a mixture of ethanol and water, the compound melted at 121–122° C. Neutral equivalent 428.92 (theory 422.06).

*Analysis.*—Theory P, 6.85; N, 6.64. Found P, 7.16; N, 6.82.

EXAMPLE 8

*O,O-diethyl O-(6-chloro-3-pyridazinyl) thiophosphate*

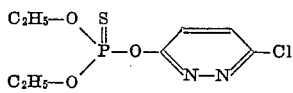

3,6-dihydroxypyridazine was refluxed in an excess of phosphorus oxychloride to give 3,6-dichloropyridazine according to the method of Rogers and English in U. S. Patent No. 2,671,086. The 3,6-dichloropyridazine was then hydrolyzed by refluxing with two molecular equivalents of 3N sodium hydroxide according to the method of Druey et al. [Helv. Chim. Acta 37, 121 (1954)], followed by acidification to yield the 3-chloro-6-hydroxypirdazine.

The sodium salt of 3-chloro-6-hydroxypyridazine (0.14 mol) and O,O-diethyl thiophosphoric chloride (0.14 mol) were added with stirring to 150 cc. of anhydrous dimethyl formamide. The temperature of the mixture rose to 40° C., and stirring was continued for 23 hours at room temperature. The reaction mixture was filtered and the solvent removed under vacuum. The resulting semi-crystalline residue was treated with 100 cc. of ether and filtered. The ether solution was washed with water, filtered through a mat of anhydrous magnesium sulfate, and treated with heptane to precipitate the product in a 46.4% yield. After recrystallization from a mixture of benzene and heptane, the compound melted at 48.5–49° C.

*Analysis.*—Theory N, 9.91; S, 11.34. Found N, 9.11; S, 11.31.

EXAMPLE 9

The procedure of Example 4 was employed using 0.15 mol of 4-chloro-3,6-dihydroxypyridazine, 0.15 mol of anhydrous sodium carbonate and 0.15 mol of O,O-diethyl thiophosphoric chloride. The crude product (55.7% yield) upon fractional crystallization from methanol yielded two crystalline products with melting points of 144–145° C. and 91–92° C.

The higher-melting isomer, O,O-diethyl O-(4-chloro-6-hydroxy-3-pyridazinyl) thiophosphate, had a neutral equivalent of 301.81 (theory 298.69).

*Analysis.*—Theory N, 9.38; S, 10.74. Found N, 9.45; S, 10.87.

The lower-melting isomer, O,O-diethyl O-(5-chloro-6-hydroxy-3-pyridazinyl) thiophosphate had a neutral equivalent of 298.29 (theory 298.69).

*Analysis.*—Theory—N, 9.38; S, 10.74. Found N, 9.50; S, 10.84.

EXAMPLE 10

The procedure of Example 4 was employed using 0.13 mol of 3,6-dihydroxy-4-phenylpyridazine, 0.13 mol of anhydrous sodium carbonate and 0.13 mol of O,O-diethyl thiophosphoric chloride. The crude product (55.6% yield) upon fractional crystallization from toluene yielded two crystalline products.

The higher-melting isomer, O,O-diethyl O-(6-hydroxy-4-phenyl-3-pyridazinyl) thiophosphate, after recrystallization from ethanol, melted at 162.5–163° C. Neutral equivalent 329.46 (theory 340.33).

*Analysis.*—Theory P, 9.10; N, 8.23. Found P, 9.66; N, 8.52.

The lower-melting isomer, O,O-diethyl O-(6-hydroxy-5-phenyl-3-pyridazinyl) thiophosphate, after recrystallization from benzene and heptane, melted at 135.5–136.5° C. Neutral equivalent 342.88 (theory 340.33).

*Analysis.*—Theory P, 910; N, 8.23. Found P, 8.71; N, 8.79.

EXAMPLE 11

The procedure of Example 4 was employed using 0.126 mol of the sodium salt of 3,6-dihydroxy-4-methylpyridazine and 0.126 mol of O,O-diethyl thiophosphoric chloride. The crude product (51.6% yield) upon fractional crystallization from methanol yielded two crystalline products with melting points of 109–109.5° C. and 88–89° C.

The higher-melting isomer, O,O-diethyl O-(6-hydroxy-4-methyl-3-pyridazinyl) thiophosphate, had a neutral equivalent of 271.81 (theory 278.27).

*Analysis.*—Theory N, 10.05; S, 11.49. Found N, 10.04; S, 11.46.

The lower-melting isomer, O,O-diethyl O-(6-hydroxy-5-methyl-3-pyridazinyl) thiophosphate, had a neutral equivalent of 273.56 (theory 278.27).

*Analysis.*—Theory N, 10.05; S, 11.49. Found N, 10.01; S, 11.54.

Other typical phosphate esters of the present invention are:

O,O-dimethyl O-(6-bromo-3-pyridazinyl) thiophosphate
O,O-di-n-butyl O-(6-bromo-3-pyridazinyl) phosphate
O,O-di-n-propyl O-(6-chloro-3-pyridazinyl) phosphate
O,O-diisobutyl O-(6-chloro-3-pyridazinyl) phosphate
O,O-diethyl O-(4,5 - dichloro - 6 - hydroxy-3-pyridazinyl) phosphate
O,O-dimethyl O-(4,5 - diethyl - 6 - hydroxy-3-pyridazinyl) thiophosphate
O,O-di-ethyl O-(6 - hydroxy-4-isopropyl - 3 - pyridazinyl) thiophosphate
O,O-di-ethyl O-(6 - hydroxy - 5 - isopropyl-3-pyridazinyl) thiophosphate
O,O-dimethyl O-(4-chloro-1-phthalazinyl) phosphate
O,O-diisobutyl O-(4-hydroxy-1-phthalazinyl) thiophosphate
O,O-diethyl O-(6-hydroxy-4-amino-3-pyridazinyl) thiophosphate
O,O-dimethyl O -(6 - hydroxy - 4 - carboxy-3-pyridazinyl) thiophosphate
O,O-diethyl O-[6 - hydroxy - 4 -(p-nitrophenyl)- 3 - pyridazinyl] phosphate
O,O-diisopropyl O-(6 - hydroxy - 4 - cyano-3-pyridazinyl) thiophosphate
O,O-di-n-propyl O-(6 - hydroxy-4-carbethoxy-3-pyridazinyl) phosphate
O,O-diethyl S-(6-mercapto-3-pyridazinyl) thiophosphate
O,O-dimethyl O-(6-methoxy-3-pyridazinyl) thiophosphate
3,6-bis(O,O - diethylthiophosphoryl)- 4,5 - dibromopyridazine The compounds of the present invention are highly active insecticides and acaricides, and may be used as sprays in organic solvents, as emulsions in water or other non-solvents, or on solid carriers such as clays, talcs, diatomaceous earths and the like.

The marked activity of the phosphate esters in controlling various insects and mites is illustrated as follows:

*Aphis rumicis.*—90 to 100% kill with esters of Examples 1, 2, 4, 5, 8 and 11 above at a concentration of 0.01% in a solvent carrier consisting of 65% acetone and 35% water.

*Tribolium confusum.*—90 to 100% kill with esters of Examples 2, 8 and 11 above at a concentration of 1.0% on solid carriers such as talc, pyrophyllite and attapulgus clay.

*German cockroach.*—100% kill with esters of Examples 1, 2, 8 and 11 above at a concentration of 1.0% on solid carriers such as pyrophyllite, attapulgus clay and fuller's earth.

*Milkweed bug.*—100% kill with esters of Examples 2, 5, 8 and 11 above at a concentration of 1.0% on solid carriers such as pyrophyllite and attapulgus clay.

*Two-spotted mite.*—100% kill with esters of Examples 1, 2, 4, 5, 8 and 11 above at a concentration of 0.01% in a solvent carrier consisting of 65% acetone and 35% water.

While the invention has been described with particular reference to specific embodiments, it is to be understood that it is not to be limited thereto, but is to be construed broadly and restricted solely by the scope of the appended claims.

I claim:

1. A phosphate ester of the general formula

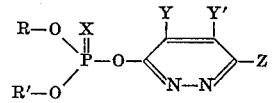

wherein R and R' represent a member of the group consisting of lower alkyl radicals, X represents a member of the group consisting of sulfur and oxygen, Z represents a member of the group consisting of Cl and OH, Y and Y' represent a member of the group consisting of hydrogen, bromine, chlorine, a phenyl radical, a lower alkyl radical, and when taken together Y and Y' represent the remainder of a benzene ring.

2. O,O-dimethyl O-(6-hydroxy-3-pyridazinyl) thiophosphate.

3. O,O-diethyl O-(6-hydroxy-3-pyridazinyl) thiophosphate.

4. O,O-diethyl O-(6-chloro-3-pyridazinyl) thiophosphate.

5. O,O-di-n-butyl O-(6-hydroxy-3-pyridazinyl) phosphate.

6. O,O-diethyl O-(6-hydroxy-4-methyl-3-pyridazinyl) thiophosphate.

7. A method of preparing a phosphate ester of the general formula

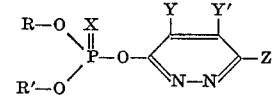

wherein R and R' represent a member of the group consisting of lower alkyl radicals, X represents a member of the group consisting of sulfur and oxygen, Z represents a member of the group consisting of Cl and OH, Y and Y' represent a member of the group consisting of hydrogen, bromine, chlorine, a phenyl radical, a lower alkyl radical, and when taken together Y and Y' represent the remainder of a benzene ring, which comprises reacting a dialkyl phosphoric chloride of the formula

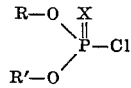

wherein X, R and R' have the meaning shown above, with an alkali metal salt of an hydroxypyridazine of the formula
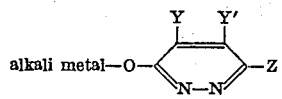
wherein Y, Y' and Z have the meaning shown above, in an inert solvent, and recovering the thus-formed phosphate ester from the reaction mixture.
8. The method of claim 7 in which the reaction is carried out at a temperature within the range of from about 10° C. to 100° C.
No references cited.